US010195720B2

(12) United States Patent
Fukui et al.

(10) Patent No.: US 10,195,720 B2
(45) Date of Patent: Feb. 5, 2019

(54) ELECTRIC CLAMP APPARATUS

(71) Applicant: SMC KABUSHIKI KAISHA, Chiyoda-ku (JP)

(72) Inventors: Chiaki Fukui, Abiko (JP); Noriyuki Miyazaki, Kashiwa (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 166 days.

(21) Appl. No.: 14/369,800

(22) PCT Filed: Oct. 11, 2012

(86) PCT No.: PCT/JP2012/076873
§ 371 (c)(1),
(2) Date: Jun. 30, 2014

(87) PCT Pub. No.: WO2013/111401
PCT Pub. Date: Aug. 1, 2013

(65) Prior Publication Data

US 2014/0367906 A1 Dec. 18, 2014

(30) Foreign Application Priority Data

Jan. 27, 2012 (JP) ................................ 2012-015335

(51) Int. Cl.
*B23Q 3/02* (2006.01)
*B25B 5/04* (2006.01)
(Continued)

(52) U.S. Cl.
CPC ................ *B25B 5/108* (2013.01); *B25B 5/04* (2013.01); *B25B 5/122* (2013.01)

(58) Field of Classification Search
CPC .. B25B 5/02; B25B 5/103; B25B 5/12; B25B 5/122; B25B 5/04
(Continued)

(56) References Cited

U.S. PATENT DOCUMENTS 2,685,824 A * 8/1954 Coop ..................... B23Q 3/069 269/317
5,996,984 A 12/1999 Takahashi
(Continued)

FOREIGN PATENT DOCUMENTS

JP 6-27032 4/1994
JP 10-306807 11/1998
(Continued)

OTHER PUBLICATIONS

Combined Taiwanese Office Action and Search Report dated Nov. 5, 2014 in Patent Application No. 101138195 with English translation.

(Continued)

*Primary Examiner* — Joseph J Hail
*Assistant Examiner* — Jon Taylor
(74) *Attorney, Agent, or Firm* — Oblon, McClelland, Maier & Neustadt, L.L.P.

(57) ABSTRACT

An electric clamp apparatus includes a body, a rotary drive unit which is driven rotatably by an electric signal, and a clamp arm disposed rotatably with respect to the body. By driving the rotary drive unit, a drive force is transmitted to the clamp arm through a drive force transmission mechanism, whereby the clamp arm is rotated via a link arm through a predetermined angle with respect to the body, and a workpiece is clamped between the clamp arm and a support member of the body. Further, rotational operation of the clamp arm is regulated by abutment of a sub-roller against an inclined portion of a displacement body.

12 Claims, 3 Drawing Sheets

(51) Int. Cl.
*B25B 5/10* (2006.01)
*B25B 5/12* (2006.01)

(58) Field of Classification Search
USPC ........................................ 269/24, 27, 228, 32
See application file for complete search history.

(56) References Cited

U.S. PATENT DOCUMENTS

| | | | | |
|---|---|---|---|---|
| 6,199,847 | B1 * | 3/2001 | Fukui | B25B 5/122 269/32 |
| 6,279,886 | B1 * | 8/2001 | Grossart | B25B 5/122 269/24 |
| 6,354,580 | B1 * | 3/2002 | Nagai | B25B 5/12 269/225 |
| 6,585,246 | B2 * | 7/2003 | McCormick | B25B 5/16 269/228 |
| 6,644,638 | B1 | 11/2003 | McCormick | |
| 6,726,194 | B2 * | 4/2004 | Migliori | B25B 5/122 269/225 |
| 2002/0017751 | A1 | 2/2002 | Takahashi et al. | |
| 2002/0063371 | A1 * | 5/2002 | Takahashi | B25B 5/087 269/32 |
| 2009/0014968 | A1 * | 1/2009 | Dolp | B23B 31/19 279/133 |
| 2011/0115319 | A1 | 5/2011 | Schade et al. | |

FOREIGN PATENT DOCUMENTS

| | | |
|---|---|---|
| JP | 2001-105332 | 4/2001 |
| JP | 2004-255559 | 9/2004 |
| TW | 487617 | 5/2002 |

OTHER PUBLICATIONS

International Search Report and Written Opinion of the International Searching Authority dated Jan. 4, 2013, in PCT/JP2012/076873, filed Oct. 11, 2012.

* cited by examiner

ELECTRIC CLAMP APPARATUS

TECHNICAL FIELD

The present invention relates to an electric clamp apparatus, which is capable of clamping a workpiece on an automated assembly line or the like.

BACKGROUND ART

Heretofore, in an automated assembly line for automobiles, an assembly process has been carried out in which clamping is performed by a clamp apparatus under a condition in which preformed body panels are positioned in an overlaid manner and the body panels are welded together.

The present applicant has proposed an electric clamp apparatus as disclosed in Japanese Laid-Open Patent Publication No. 2001-105332. The electric clamp apparatus is equipped with a body, a rotary drive unit disposed in the interior of the body, and a clamp arm, which projects outwardly with respect to the body. By transmitting a rotary drive force of the rotary drive unit to a ball screw mechanism, the clamp arm is operated through a toggle link mechanism so as to rotate through a predetermined angle for clamping a workpiece or the like, for example.

SUMMARY OF INVENTION

A general object of the present invention is to provide an electric clamp apparatus in which a stable clamping force can always be obtained without requiring adjustment operations to be performed on a clamp arm, together with enabling various workpieces of different thicknesses to be clamped in a stable manner.

The present invention is an electric clamp apparatus comprising a body, a drive unit which is driven rotatably by an electric signal and generates a drive force, a drive force transmission mechanism having a displacement body, which converts rotational motion into linear motion by being displaced in an axial direction under a rotary action of the drive unit, a clamp arm disposed rotatably with respect to the body and which is rotated by the drive force for gripping a workpiece, and a lock mechanism for regulating rotational operation of the clamp arm at a time of clamping of the workpiece by the clamp arm, wherein the lock mechanism is constituted from a roller that is disposed rotatably on the clamp arm, and an inclined portion against which the roller abuts, and which is inclined at a predetermined angle with respect to a direction of displacement of the displacement body, the inclined portion being inclined such that, at the time of clamping, the roller gradually is pressed toward a side of the clamp arm.

According to the present invention, without providing a toggle link mechanism, at a time of clamping a workpiece, rotational operations of the clamp arm can be regulated. Together therewith, even in the case of clamping workpieces of different thicknesses, clamping of such workpieces can be carried out reliably and stably without requiring adjustment operations to be performed each time that the thickness of the workpiece is changed.

The above and other objects, features, and advantages of the present invention will become more apparent from the following description when taken in conjunction with the accompanying drawings in which a preferred embodiment of the present invention is shown by way of illustrative example.

DESCRIPTION OF EMBODIMENTS

Figure 1:
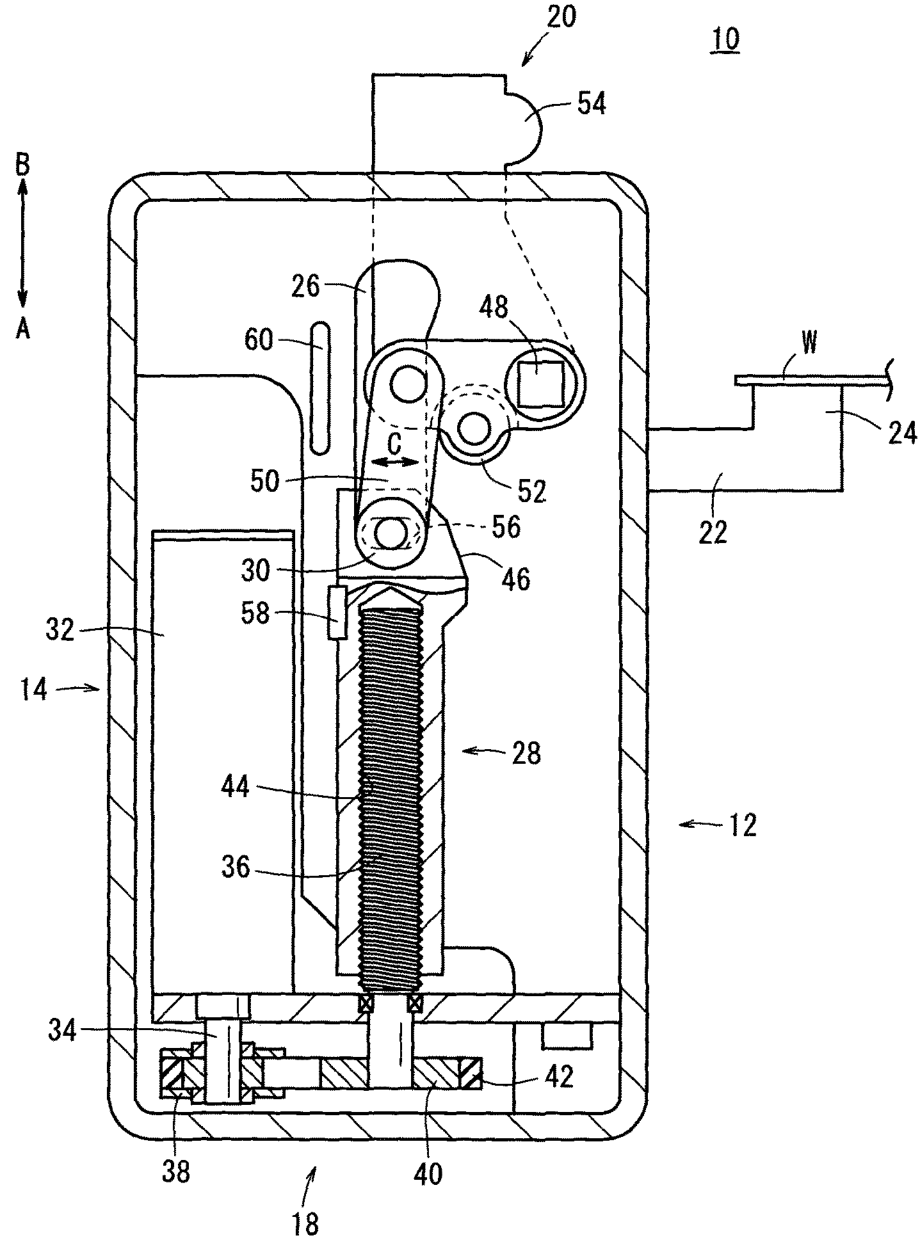
FIG. 1 is an overall cross sectional view showing an electric clamp apparatus according to an embodiment of the present invention.
Figure 2:
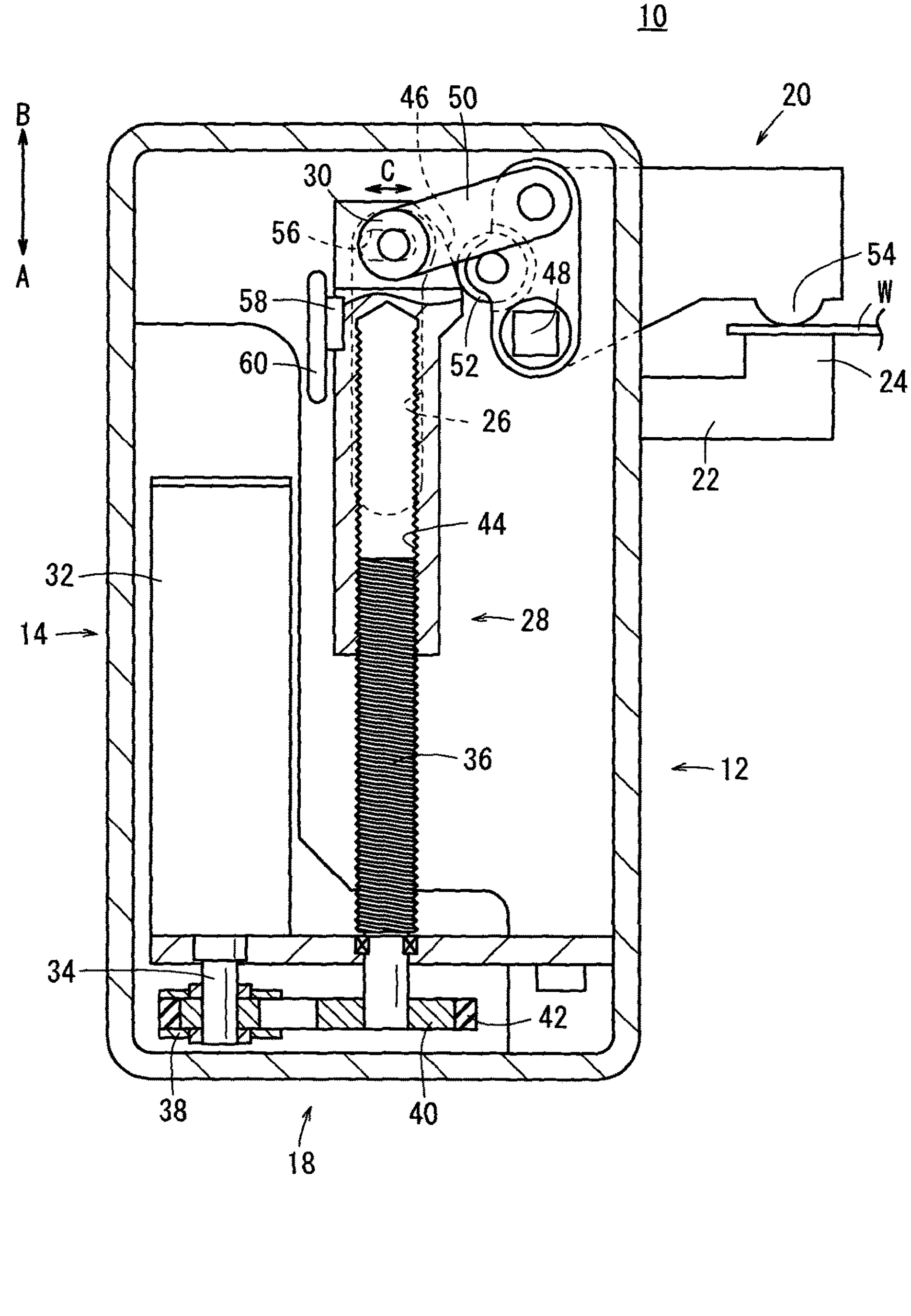
FIG. 2 is an overall cross sectional view showing a condition in which a clamp arm in the electric clamp apparatus of FIG. 1 is rotated further.
Figure 3:
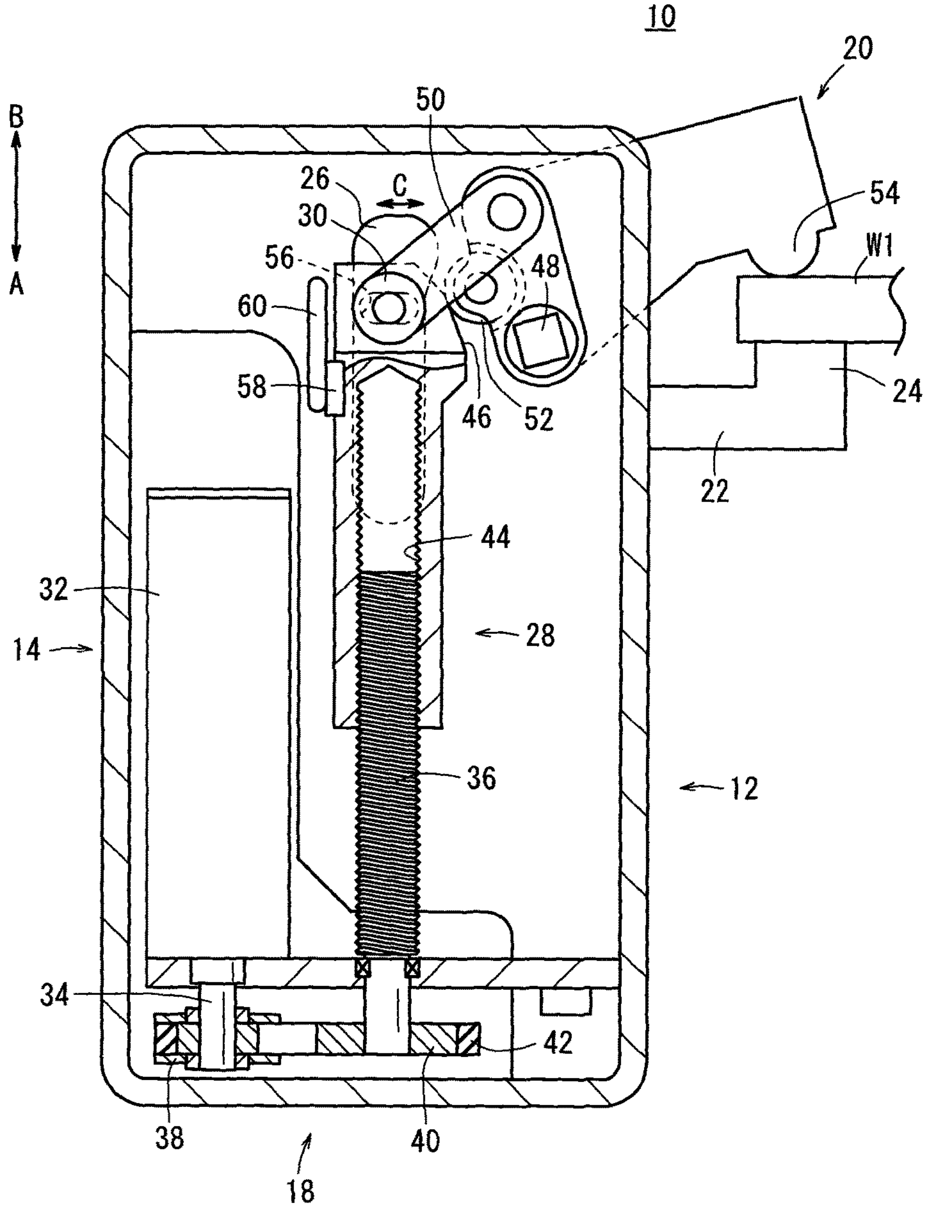
FIG. 3 is an overall cross sectional view showing a condition in the electric clamp apparatus of FIG. 2 in which a workpiece having a large plate thickness is clamped.

As shown in FIGS. 1 through 3, an electric clamp apparatus 10 includes a hollow body 12, a rotary drive unit (drive unit) 14 disposed in the interior of the body 12, a drive force transmission mechanism 18 that transmits a rotary drive force of the rotary drive unit 14 to a clamp arm 20, and the clamp arm 20, which is disposed rotatably with respect to the body 12.

The body 12, for example, is formed with an elongate substantially rectangular shape in cross section extending in a vertical direction (the direction of arrows A and B). A support member 22 is provided, which projects laterally on an upper portion of the body 12. The support member 22 projects outwardly in a horizontal direction having a predetermined length with respect to a side surface of the body 12, and is formed on the end thereof with a gripping section 24, which projects upwardly.

Additionally, as shown in FIG. 2, at a time of clamping when the clamp arm 20 is rotated, a workpiece W is clamped between the clamp arm 20 and the support member 22.

Further, a roller groove 26, which extends in a vertical direction (the direction of arrows A and B), is formed in a substantially central portion of the body 12. Rollers 30, which are provided on a later-described displacement body 28, are inserted in and guided by the roller groove 26.

The rotary drive unit 14 is made up, for example, from a rotary drive source 32 such as an induction motor, a brushless motor, or the like, which is driven rotatably by an electric signal that is input thereto. The rotary drive source 32 is disposed along a vertical direction of the body 12 (the direction of arrows A and B), with a drive shaft 34 thereof being arranged in a downward direction (in the direction of the arrow A).

The drive force transmission mechanism 18 includes a feed screw shaft 36, which is disposed rotatably in a substantially central portion of the body 12, a drive pulley 38 connected to the drive shaft 34 of the rotary drive source 32, a driven pulley 40, which is connected to a lower end of the feed screw shaft 36, a transmission belt 42 trained between the drive pulley 38 and the driven pulley 40, and the displacement body 28, which is screw-engaged with an outer circumferential side of the feed screw shaft 36.

The feed screw shaft 36 is an axial body having a predetermined length, which is arranged to extend in a vertical direction (the direction of arrows A and B) in the interior of the body 12. Upper and lower ends of the feed screw shaft 36 are supported rotatably with respect to the body 12. Further, screw grooves are formed in a helical shape on the outer circumferential surface of the feed screw shaft 36, and the feed screw shaft 36 is disposed in parallel with the rotary drive unit 14 in the interior of the body 12.

The drive pulley 38 and the driven pulley 40 are shaped respectively as disks, and are disposed at the same height so that mutual outer circumferential surfaces thereof face toward one another (see FIG. 1). In addition, the transmission belt 42 is trained around respective outer circumferential surfaces of the drive pulley 38 and the driven pulley 40, such that by driving the rotary drive unit 14, the drive pulley 38 is rotated, and the rotational force thereof is transmitted through the transmission belt 42 to, the driven pulley 40, whereby the driven pulley 40 and the feed screw shaft 36 are rotated together in unison.

The displacement body 28 is formed in a cylindrical shape with a predetermined length along the axial direction (the direction of arrows A and B). Female screw threads 44, which are formed on an interior portion of the displacement body 28, are screw-engaged with the feed screw shaft 36. More specifically, the feed screw shaft 36 is inserted into the interior of the displacement body 28 and is held in threaded engagement therewith. Additionally, the displacement body 28 is moved in the axial direction (the direction of arrows A and B) by rotation of the feed screw shaft 36.

Further, a pair of the rollers 30 is provided rotatably on the upper part of the displacement body 28. By insertion of the rollers 30 in the roller groove 26 of the body 12, the displacement body 28 is guided in a vertical direction (the direction of arrows A and B) upon movement thereof, whereas rotational displacement of the displacement body 28 is restricted.

The rollers 30 are movable only by a predetermined distance in directions (the directions of the arrow C) perpendicular with respect to the axial direction (the direction of arrows A and B) of the displacement body 28, through a link groove 56 formed on an upper part of the displacement body 28. An end of a link arm 50, which is pivotally supported on the displacement body 28 together with the rollers 30, is disposed for movement in a direction perpendicular to the axial direction of the displacement body 28.

Moreover, on the upper portion of the displacement body 28 confronting the clamp arm 20, an inclined portion 46 is formed, which tapers gradually toward an upper end thereof. When the clamp arm 20 is rotated from an unclamped state into a clamped state, a sub-roller 52 of the clamp arm 20 comes into abutment against the inclined portion 46.

The link arm 50 is connected between an upper part of the displacement body 28 and the clamp arm 20. The link arm 50 is pivotally supported on the displacement body 28 together with the rollers 30, as well as being pivotally supported on an upper corner portion of the clamp arm 20 in the clamped state (see FIG. 2). In addition, via the displacement body 28, the link arm 50 converts linear motion of the feed screw shaft 36 into rotary motion of the clamp arm 20.

On the other hand, on another side portion of the displacement body 28, a guide body 58 is provided that extends in the axial direction (the direction of arrows A and B) of the displacement body 28, and projects outwardly with respect to the side portion, such that when the displacement body 28 is displaced upwardly (in the direction of the arrow B), the guide body 58 moves into abutment against a guide rail 60 provided in the body 12. Consequently, the displacement body 28 can be moved in a vertical direction (the direction of arrows A and B) while being guided along the guide rail 60. More specifically, the guide body 58 and the guide rail 60 function together as a guide means for guiding movement of the displacement body 28 in the axial direction (the direction of arrows A and B).

The clamp arm 20 is formed, for example, with a substantially rectangular shape in cross section, a lower corner portion of one end of the clamp arm 20 being supported rotatably with respect to the body 12 through a support pin 48, and the link arm 50 being pivotally supported on the upper corner portion above the aforementioned lower corner portion.

Further, the sub-roller 52 is supported rotatably between the lower corner portion and the upper corner portion on the end of the clamp arm 20. During rotation of the clamp arm 20, the sub-roller 52 rotates in abutment against the inclined portion 46 of the displacement body 28.

On the other hand, on the other end of the clamp arm 20, a projection 54 is provided that projects outwardly in a hemispherical shape. The projection 54 is disposed to confront the gripping section 24 of the support member 22 at a time of clamping. Additionally, in a clamped state in which the clamp arm 20 has been rotated through a predetermined angle, the workpiece W is clamped and gripped between the projection 54 and the support member 22.

The electric clamp apparatus 10 according to the first embodiment of the present invention is constructed basically as described above. Next, operations and advantageous effects of the electric clamp apparatus 10 shall be described. In the following description, an unclamped state, as shown in FIG. 1, shall be treated as an initial position. In the initial position, the projection 54 of the clamp arm 20 is positioned roughly perpendicularly with respect to the gripping section 24 of the support member 22, and the link arm 50 is arranged substantially along a straight line directly above the displacement body 28.

At first, in the initial position of the electric clamp apparatus 10 shown in FIG. 1, by inputting an electric signal from a non-illustrated controller with respect to the rotary drive source 32 of the rotary drive unit 14, the rotary drive source 32 rotates the drive shaft 34, and the drive pulley 38 is rotated along with the drive shaft 34. Additionally, upon rotation of the drive pulley 38, the driven pulley 40 is rotated along therewith, thereby rotating the feed screw shaft 36. By rotation of the feed screw shaft 36, the displacement body 28 moves upwardly (in the direction of the arrow B) while being guided by the rollers 30 with respect to the roller groove 26, and along therewith, the link arm 50 starts to rotate clockwise about the location where the link arm 50 is pivotally supported on the displacement body 28, and the clamp arm 20 is rotated clockwise through a predetermined angle about the support pin 48.

Consequently, as shown in FIG. 2, the projection 54 of the clamp arm 20 is brought into abutment against the workpiece W, and a clamped state is brought about in which the workpiece W is gripped between the support member 22 of the body 12 and the projection 54.

At this time, accompanying rotation of the clamp arm 20, via the link arm 50, the rollers 30 move along the link groove 56 in a direction to approach the clamp arm 20, and the sub-roller 52 abuts against the inclined portion 46 of the displacement body 28 and presses the clamp arm 20, whereby a locked condition is brought about in which rotation of the clamp arm 20 is locked, and the clamped state of the workpiece W can be maintained.

On the other hand, as shown in FIG. 3, in contrast to the aforementioned workpiece W, in the case that a workpiece W1 having a large plate thickness is clamped, as a result of the projection 54 of the clamp arm 20 being placed in abutment against the workpiece W1, the angle of rotation of the clamp arm 20 is smaller compared to the case of gripping a workpiece W having a small plate thickness. As a consequence, clamping occurs in a condition in which the angle of rotation of the clamp arm 20 is comparatively small, and the rollers 30 are positioned at a substantially central portion of the link groove 56. In this case as well, because the sub-roller 52, which is disposed on the one end of the clamp arm 20, abuts against the inclined portion 46 of the displacement body 28, and also is pressed toward the other end side of the clamp arm 20, a locked condition is brought about in which rotational operation of the clamp arm 20 is regulated.

In the foregoing manner, with the present embodiment, the clamp arm 20 is rotated by the link arm 50 under operation of the rotary drive unit 14, and the sub-roller 52 of the clamp arm 20 abuts against the inclined portion 46 of the displacement body 28, whereby rotational operation at the time of clamping is regulated. Specifically, rotational operation of the clamp arm 20 is carried out by the link arm 50, and regulation of the rotational operation of the clamp arm 20 is carried out by the sub-roller 52 and the inclined portion 46. Consequently, when workpieces W, W1 are clamped by the electric clamp apparatus 10, workpieces W, W1 of different plate thicknesses, ranging from thin plates to thick plates, can be clamped reliably and stably without performing any adjustment operations.

The electric clamp apparatus according to the present invention is not limited to the aforementioned embodiment, and it is a matter of course that various additional or modified structures may be adopted therein without deviating from the essential gist of the present invention.

The invention claimed is:

1. An electric clamp apparatus comprising:
- a body;
- a drive unit which is driven rotatably by an electric signal and generates a drive force;
- a drive force transmission mechanism having a displacement body, which converts rotational motion into linear motion by being displaced in an axial direction under a rotary action of the drive unit;
- a clamp arm disposed rotatably with respect to the body through a support pin and which is rotated by the drive force to grip a workpiece;
- a link arm that pivotally connects the clamp arm and the displacement body; and
- a lock mechanism to regulate rotational operation of the clamp arm at a time of clamping of the workpiece by the clamp arm,
- wherein the lock mechanism includes a roller that is disposed rotatably on the clamp arm, and an inclined portion immovably formed on the displacement body, the roller to abut against the inclined portion, the inclined portion being inclined at a predetermined angle with respect to a direction of displacement of the displacement body, the inclined portion being inclined such that, at the time of clamping, the roller gradually is pressed toward a side of the clamp arm,
- wherein the inclined portion includes a first inclined portion and a second inclined portion, the first inclined portion forms a first positive acute angle with the axial direction and the second inclined portion forms a second positive acute angle, smaller than the first positive acute angle, with the axial direction,
- wherein a lower corner portion of a first end side of the clamp arm is rotatably supported by the support pin, and an upper corner portion of the first end side of the clamp arm is rotatably supported by a pivoting connection to the link arm,
- wherein a plane is defined by an axis of rotation of the support pin and an axis of rotation of the pivoting connection,
- wherein a line orthogonal to the plane which intersects an axis of rotation of the roller is between the axis of rotation of the support pin and the axis of rotation of the pivoting connection,
- wherein the clamp arm includes a projection with a curvature, the curvature configured to contact the workpiece in a clamped position,
- wherein an orientation of the clamp arm with respect to the support member in the clamped position is variable in order to clamp workpieces of different thicknesses, and
- wherein the roller abuts against one of the first inclined portion and the second inclined portion in a fully clamped condition.

2. The electric clamp apparatus according to claim 1, further comprising a guide mechanism that guides the displacement body in the axial direction.

3. The electric clamp apparatus according to claim 2, wherein the guide mechanism comprises:
- a guide body disposed on a side surface of the displacement body; and
- a guide rail disposed on the body facing toward the guide body,
- wherein the guide rail extends in parallel with the direction of displacement of the displacement body.

4. The electric clamp apparatus according to claim 1, wherein the inclined portion is gradually tapered toward an end proximate to the clamp arm.

5. The electric clamp apparatus according to claim 1, wherein the clamp arm clamps the workpiece on a second end side of the clamp arm, which is opposite from the first end side.

6. The electric clamp apparatus according to claim 1, wherein the projection is shaped in a hemisphere.

7. The electric clamp apparatus according to claim 6, the apparatus further including a support member extending from the body and including a gripping section, wherein the gripping section provides a flat surface against which the projection is to abut.

8. An electric clamp apparatus comprising:
- a body;
- a support member extending from the body and including a gripping section;
- a drive unit which is driven rotatably by an electric signal and generates a drive force;
- a drive force transmission mechanism having a displacement body, which converts rotational motion into linear motion by being displaced in an axial direction under a rotary action of the drive unit;
- a clamp arm disposed rotatably with respect to the body through a support pin and which is rotated by the drive force to grip a workpiece;
- a link arm that pivotally connects the clamp arm and the displacement body; and
- a lock mechanism to regulate rotational operation of the clamp arm at a time of clamping of the workpiece by the clamp arm,
- wherein the lock mechanism includes a roller that is disposed rotatably on the clamp arm, and an inclined portion against which the roller abuts, and which is inclined at a predetermined angle with respect to a direction of displacement of the displacement body, the inclined portion being inclined such that, at the time of clamping, the roller gradually is pressed toward a side of the clamp arm,
- wherein a lower corner portion of a first end side of the clamp arm is rotatably supported by the support pin, and an upper corner portion of the first end side of the clamp arm is rotatably supported by a pivoting connection to the link arm, wherein a plane is defined by an axis of rotation of the support pin and an axis of rotation of the pivoting connection, wherein a line orthogonal to the plane which intersects an axis of rotation of the roller is between the axis of rotation of the support pin and the axis of rotation of the pivoting connection, wherein a second side end of the clamp arm includes a projection with a curvature, the curvature configured to contact the workpiece in a clamped position, wherein, once the clamp arm is rotated to grip the workpiece, the projection confronts the gripping section thereby clamping the workpiece between the projection and the gripping section in the clamped position, wherein an orientation of the clamp arm with respect to the support member in the clamped position is variable in order to clamp workpieces of different thicknesses, and wherein the roller abuts against the inclined portion in a fully clamped condition.

9. The electric clamp apparatus according to claim 8, wherein the gripping section provides a flat surface against which the projection is to abut.

10. The electric clamp apparatus according to claim 8, wherein the projection has a semi-circular cross-section.

11. The electric clamp apparatus according to claim 8, wherein the projection is shaped in a hemisphere.

12. An electric clamp apparatus comprising:

a body;

a drive unit which is driven rotatably by an electric signal and generates a drive force;

a drive force transmission mechanism having a displacement body, which converts rotational motion into linear motion by being displaced in an axial direction under a rotary action of the drive unit;

a clamp arm disposed rotatably with respect to the body through a support pin and which is rotated by the drive force to grip a workpiece;

a link arm that pivotally connects the clamp arm and the displacement body; and a lock mechanism to regulate rotational operation of the clamp arm at a time of clamping of the workpiece by the clamp arm, wherein the lock mechanism includes a roller that is disposed rotatably on the clamp arm, and an inclined portion immovably formed on the displacement body, the roller to abut against the inclined portion, the inclined portion being inclined at a predetermined angle with respect to a direction of displacement of the displacement body, the inclined portion being inclined such that, at the time of clamping, the roller gradually is pressed toward a side of the clamp arm, wherein the inclined portion includes a first inclined portion and a second inclined portion, the first inclined portion forms a first positive acute angle with the axial direction and the second inclined portion forms a second positive acute angle, smaller than the first positive acute angle, with the axial direction, wherein a lower corner portion of a first end side the clamp arm is rotatably supported by the support pin, and an upper corner portion of the first end side of the clamp arm is rotatably supported by a pivoting connection to the link arm, wherein a plane is defined by an axis of rotation of the support pin and an axis of rotation of the pivoting connection, wherein a line orthogonal to the plane which intersects an axis of rotation of the roller is between the axis of rotation of the support pin and the axis of rotation of the pivoting connection, and wherein a second side end of the clamp arm includes a projection with a curvature, the curvature configured to contact the workpiece in a clamped position.

* * * * *